C. C. GATES.
PNEUMATIC TIRE.
APPLICATION FILED MAR. 12, 1919.

1,339,951.

Patented May 11, 1920.

Inventor
Charles C. Gates.
By
Attorney

UNITED STATES PATENT OFFICE.

CHARLES C. GATES, OF DENVER, COLORADO, ASSIGNOR TO THE GATES RUBBER COMPANY, OF DENVER, COLORADO, A CORPORATION OF COLORADO.

PNEUMATIC TIRE.

1,339,951.      Specification of Letters Patent.      Patented May 11, 1920.

Application filed March 12, 1919. Serial No. 282,110.

*To all whom it may concern:*

Be it known that I, CHARLES C. GATES, a citizen of the United States, residing in the city and county of Denver and State of Colorado, have invented certain new and useful Improvements in Pneumatic Tires; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pneumatic tires, my object being to provide a tire which, when originally constructed, shall have an inner stretched or stressed element and an outer nonstretched or nonstressed element, or an element stretched or stressed to a lesser degree than the inner element; and further, to so construct the tire that there shall be a preferential area of separation between the two elements.

In this tire the outer element takes the wear of the road, while the inner element resists the strain due to inflation—hence the function of each is distinctive and it must possess a quality peculiar to its function. When properly constructed, and in the absence of abuse or abnormal treatment, the inner element should last indefinitely, or wear as long as a number of outer elements. Hence, the preferential area of separation between the two elements is valuable from the fact that it makes it practicable to readily remove the outer element when sufficiently worn to justify it, and the substitution of a new outer or wearing tire element.

As the outer element is directly exposed to the road shocks and comes in direct contact with sharp objects or protuberances which are encountered during travel, it is important that this outer element shall have the quality of distributing and absorbing these shocks without damage to itself to the greatest possible degree. That any material which is stretched or stressed or drawn taut or placed under tension is easily broken or punctured or ruptured or abraded, is well understood. Hence the advantage of providing an outer tire element that is stressed or stretched to the least possible degree consistent with the maintenance of its position and the performance of its function as an integral element of the tire.

Tires, as heretofore constructed, have had their layers of rubberized fabric or cords composed of a similar material equally stretched or stressed when originally constructed, and consequently their superposed layers, whether of fabric or cords, are all equally stretched or stressed or placed under strain when the tire is inflated. This is a defect, and consequently a distinct disadvantage in pneumatic tires as at present constructed, and my object is to overcome this defective construction.

Hence, in constructing my improved tire, the required number of the inner fabric layers of the tire, are stretched or stressed as usual, as they are applied to the core. The number of these stretched or stressed layers may be as great as desired, depending upon the size of the tire and the strength required to resist the pressure due to inflation. After this is done, one or more outer layers of fabric, or other similar or suitable material, are applied to the said inner element in a nonstretched or nonstressed condition, care being taken that the quality or condition of the rubber compound on the outer surface of the inner element, or on the inner adjacent surface of the outer element, or both, shall be such that the area between the two elements shall have a preferential separating capacity to permit the removal of the outer tire element when worn and the substitution of a new similar element, as circumstances may require or dictate. This means that the rubber compound located in the area between the inner and outer elements shall be of such character or quality that while after vulcanization it will securely and properly maintain the two elements in their integral and coöperative tire relation, shall, nevertheless, be so differentiated from the other rubber compound employed in the construction of the tire, that it may be somewhat softer and more yielding in order that the outer element may be removed from the inner element without distorting or tearing or injuring the latter in any way. Or the outer skim coat layer of rubber compound of the outermost stretched layer of fabric, or the innermost skim coat of the innermost unstretched fabric layer, or both, may be less in quantity than used with the other layers of fabric. Either of these expedients may be resorted to, or any other suitable plan may be adopted to produce the required result. This is clearly practicable, as it is well known that this rubberized material is capable of being compounded in such a manner as to provide the necessary variation or differentiation in quality to produce the aforesaid result; and also that in applying the skim coat of rubber compound to any layer of fabric when preparing the latter for use in a tire, it may be varied as to quantity, as may be required, so that the skim coat on either side of any layer of fabric may be made thinner than the corresponding coat on any other layer of fabric.

After applying one or more nonstretched or nonstressed layers of material, as heretofore explained, the tire may be finished in the usual manner by the application of the centrally located breaker strip, the cushion strips on opposite sides of the breaker strip, the side walls and the tread member.

The tire will then be vulcanized in the usual manner, after which it will present the same appearance both in elevation and cross section as an ordinary tire.

It will be understood that the novelty of this tire resides in the inherent quality explained, rather than in any feature of construction that is visible to the eye or capable of illustration by drawing.

This invention gives increased wearing capacity to the outer element of the tire, and consequently to the inner element, because the latter is better protected by the outer nonstressed element due to its quality for resisting the penetration of objects and its quality for distributing and absorbing road shocks, as heretofore explained; and further, the invention makes it practicable to easily remove the outer nonstressed element and to substitute a new similar element, all as heretofore explained in detail.

By virtue of the fact that as originally constructed, the outer wearing element of the tire is nonstressed or stressed to a lesser degree than the inner element, this outer element has a capacity for enlarging as the inner member is stressed due to inflation without producing an injurious degree of tension in the outer member when the tire is in use.

It is believed that the invention will be better understood by referring to the accompanying drawing in which.

The same reference characters indicate the same parts in all the views.

Figure 1:
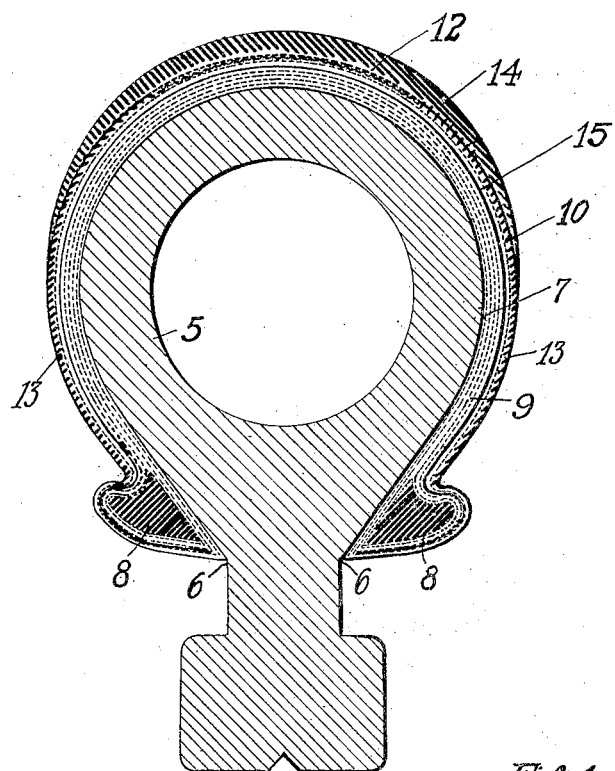
Figure 1 is a cross section of a tire core, showing a tire built thereon and ready for vulcanization.
Figure 2:
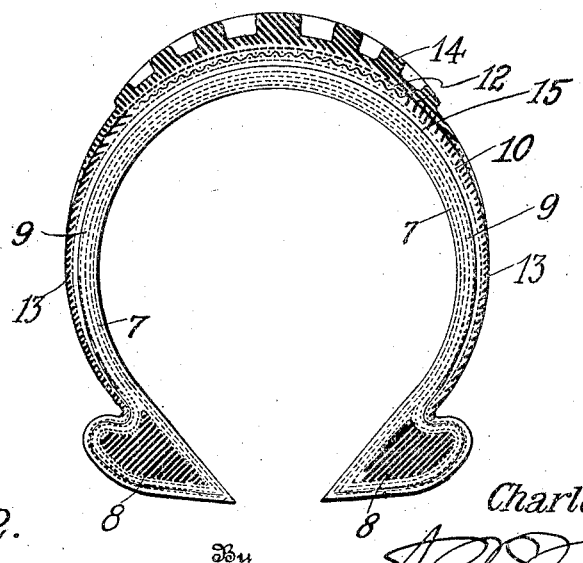
Fig. 2 is a cross section of the tire after vulcanization and showing the same removed from the core.

Let the numeral 5 designate the core, which is circular in shape, in side elevation, and is mounted to be rotated while building the tire thereon. In the first instance, one extremity of a layer of woven rubberized fabric, whose warp and woof form oblique angles with the length of the core, is applied to the tread, or the central portion of its periphery, the rubber compound causing it to adhere securely to the metal surface of the core. The core is then rotated and the operator pulls on the layer of fabric in a lengthwise direction with considerable force, whereby the fabric layer is stretched to a considerable degree as the core rotates. This layer of rubberized fabric is just long enough to reach around the core so that its free extremity is caused to overlap the opposite extremity or that which was originally applied. The sides of the fabric on both sides of the tread are then smoothed down around the core, terminating at points 6 of the core, where the toe of the tire is located when completed. One or more other layers of rubberized fabric are then applied to the core outside of the first layer and in the same manner. In the drawing I have shown two of these layers, and they are designated by the numeral 7. After these initial layers of rubberized fabric are applied and stretched during such application as heretofore explained, the beads 8 are applied, these beads consisting of rubberized compound of suitable shape and character, so that when vulcanized they will be relatively hard. Other layers of the rubberized fabric are then applied outside of the layers 7 and carried around the bead and extended to the toe of the tire adjacent the point 6 of the core. In the drawing two of these outer layers are illustrated and designated by the numeral 9. Each of the four layers 7 and 9 of rubberized fabric are stretched equally, as they are applied to the core, this stretching being done by the operator, who pulls upon the fabric so that it is given approximately as much tension as the strength of the operator affords, after which the layers on opposite sides of the tread are smoothed down, as heretofore explained, the two outer layers, 9, being carried around the bead in a manner that will be readily understood.

More than four layers of fabric may be employed for the body or carcass of the tire, the carcass being the portion which is constructed to resist inflation stress when the tire is in use. However, in the illustration it is assumed that this carcass or structural member of the tire consists of four layers of the rubberized fabric, two being between the bead and the core, and the other two carried around the bead to the toe of the tire on each side.

After this is done, one or more other layers of rubberized fabric are applied to the outermost layer 9. As shown in the drawing a single outer layer of fabric is applied, this layer being designated by the numeral 10. This layer 10 is applied in a manner similar to the other layers, except that it is not stretched or stressed during its application, or in any event, is stretched or stressed to a lesser degree than the inner layers 7 and 9. This layer 10 of fabric is carried around the bead and may extend to the toe of the tire on each side, as shown in the drawing. Assuming that a single layer of rubberized fabric 10 is employed, as shown in the drawing, to form a part of the outer member of the tire, the tire is then finished in the usual manner by first applying a breaker strip, 12, which occupies the tread area only, or the portion of the area extending a short distance on both sides of the central or tread circumference. After this is done the side walls, 13, are applied. These side walls consist of rubber compound, and extend from the opposite extremities of the breaker strip to the bead of the tire on each side. The tread portion 14 is then applied. This consists of rubber compound and completely covers the breaker strip and extends downwardly over the side walls on both sides for a short distance— say approximately one-third of each side wall member being covered by the tread portion.

It should be explained that in preparing the outermost layer 9 of rubberized fabric, being the outermost of the stretched layers, the skim coat of rubber compound applied thereto may be of such character as to form the proper preferential area of separation between the outer tire member and the inner tire member, this preferential area being indicated by a line designated by the numeral 15. This skim coat of rubber compound may be of such quality as to produce the desired result after vulcanization. Or, it may be of the same quality, but less in quantity, that is, made thinner than usual, and consequently thinner than the corresponding skim coats of the remaining stretched layers 7 and 9, of the carcass or structural element of the tire. It should be explained, however, that the invention is not limited to any particular method or structure for producing this preferential area of separation whose object, as heretofore explained, is to make it practicable to readily remove the outer or wearing element of the tire after the latter has become so worn as to justify or require such removal. The term skim coat as used in this specification, is a very thin coating of rubber applied to the fabric, slightly heavier than the ordinary frictioning.

It will thus be understood that the portion of the tire outside of the line 15 constitutes the outer or wearing element of the tire and, as shown in the drawing, is composed of the layer 10 of rubberized fabric, the breaker strip 12, the side walls 13, and the tread 14.

I claim:

1. A tire composed of an inner element stressed to resist inflation pressure and an outer element non-stressed to provide capacity for enlargement due to inflation without producing a detrimental degree of stress when the tire is in use, the two members having a common rim-anchorage and the structure being vulcanized whereby they are operatively connected.

2. A tire composed of an inner element stressed to resist inflation pressure and an outer element stressed to a lesser degree than the inner element, the two elements having a common rim-anchorage and the structure being vulcanized whereby the two elements are operatively connected.

3. A tire composed of an inner stressed structural member and an outer non-stressed wearing member, the two members having a common rim-anchorage and the structure being built up together and vulcanized.

4. A tire having two bead elements only, an inner stressed member and an outer member stressed to a lesser degree, and constructed to form an integral device.

5. A tire composed of an inner structural member and an outer wearing member, the rubberized fibrous material of the inner member being stressed, and the similar material of the outer member non-stressed, the two members having a common rim-anchorage, and the structure being vulcanized, whereby they are connected in coöperative relation.

6. A tire composed of an inner structural member and an outer wearing member, the rubberized fibrous material of the inner member being stressed and the similar material of the outer member being stressed to a lesser degree, the two members having a common rim-anchorage, and the structure being built up together and finally vulcanized to form an integral device.

7. A pneumatic tire composed of an inner structural element and an outer wearing element, the fibrous material of the inner element being normally stretched to resist inflation pressure and the corresponding material of the outer element normally non-stretched to enhance its toughness and wearing capacity, the two members having a common rim-anchorage and the tire being vulcanized to form a structural entity.

8. A pneumatic tire vulcanized to form an integral device and composed of an inner structural element and an outer wearing element and having a preferential area of separation between the two elements.

9. A pneumatic tire vulcanized to form an integral device and composed of an inner structural element and an outer wearing element, the two elements having a common rim-anchorage, and the outer element being readily separable from the inner element.

10. A pneumatic tire vulcanized to form an integral device and composed of an inner stressed structural member and an outer non-stressed wearing member, there being a preferential area of separation between the two members.

11. A pneumatic tire vulcanized to form an integral device and composed of an inner stressed member and an outer wearing member stressed to a lesser degree than the inner member, the outer member being readily separable from the inner member and the two members having a common rim-anchorage.

In testimony whereof I affix my signature.

CHARLES C. GATES.